No. 825,140. PATENTED JULY 3, 1906.
E. L. LULL.
ARTIFICIAL BAIT.
APPLICATION FILED APR. 4, 1905. RENEWED JAN. 3, 1906.

2 SHEETS—SHEET 1.

Witnesses

Inventor
E. L. Lull
By
Attorneys

No. 825,140. PATENTED JULY 3, 1906.
E. L. LULL.
ARTIFICIAL BAIT.
APPLICATION FILED APR. 4, 1905. RENEWED JAN. 3, 1906.

2 SHEETS—SHEET 2.

Witnesses

Inventor
E. L. Lull
By Chandler & Chandler
Attorneys

UNITED STATES PATENT OFFICE.

EDWARD L. LULL, OF ELKHORN, WISCONSIN.

ARTIFICIAL BAIT.

No. 825,140.     Specification of Letters Patent.     Patented July 3, 1906.

Application filed April 4, 1905. Renewed January 3, 1906. Serial No. 294,404.

*To all whom it may concern:*

Be it known that I, EDWARD L. LULL, a citizen of the United States, residing at Elkhorn, in the county of Walworth, State of Wisconsin, have invented certain new and useful Improvements in Artificial Baits; and I do hereby declare the following to be a full, clear, and exact description of the invention, such as will enable others skilled in the art to which it appertains to make and use the same.

This invention relates to devices used in fishing, and more particularly to articles of bait, and has for its object to provide a device of this nature which will be arranged to operate automatically when swallowed by a fish to securely hook the fish, the arrangement of parts being extremely simple, so that efficient operation is assured.

Another object is to provide bait which may be manufactured at a very low figure.

Other objects and advantages will be apparent from the following description, and it will be understood that modifications of the specific construction shown may be made and any suitable materials may be used without departing from the spirit of the invention.

Figure 1:
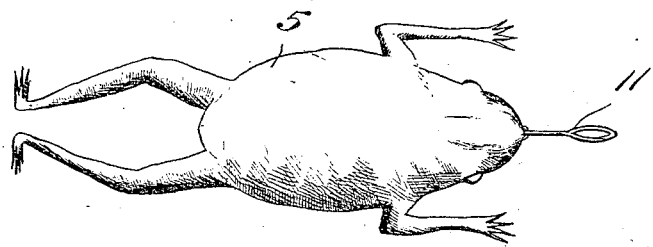
Figure 2:
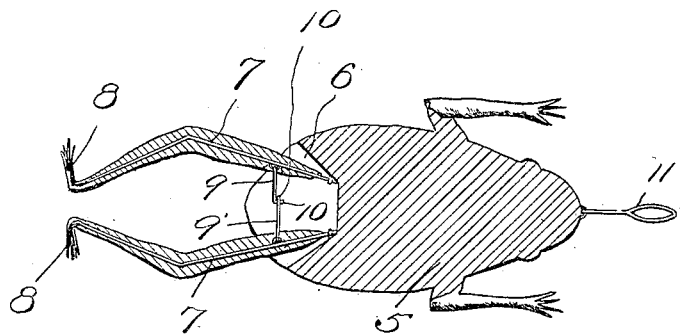
Figure 3:
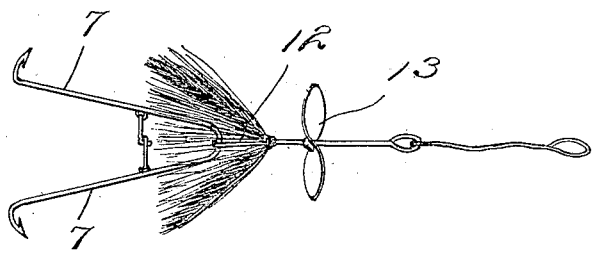
Figure 4:
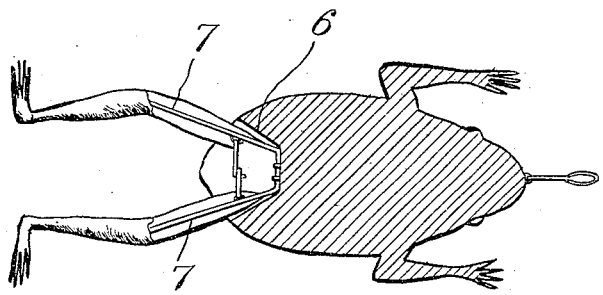

In the drawings forming a portion of this specification, and in which like numerals of reference indicate similar parts in the several views, Figure 1 is a view showing the invention constructed in the form of a frog. Fig. 2 is a sectional view of Fig. 1, showing the arrangement of the legs and the latch. Fig. 3 is a view showing different form of the invention, including a spinner, and illustrating the latch as disengaged and the legs separated. Fig. 4 is a view similar to Fig. 2, showing a modification.

Referring now to the drawings, and more particularly to Figs. 1 and 2, there is shown a body portion 5, which in these figures has the form of the body of a frog. In the rearward end of the body portion there is a recess 6, to the side walls of which are secured the forward end portions of rearwardly-extending spring-rods, the free ends of which are turned outwardly and sharpened to form hooks 8. Beyond the body portion 5 these springs are turned to extend normally away from each other, the resiliency of the material of which they are formed holding them yieldably in their normal positions, and these rods are provided with coöperating hooks 9 and 9', which form a latch arranged to hold the rods with their free ends moved inwardly, as shown in Fig. 2. The hooks 9 and 9' are hinged to the inner faces of the rods with their bills 10 turned in opposite directions, and these hooks are of such a length that when their bills are engaged with each other the rods are held out of their normal positions, as mentioned above, and the tendency of the rods to separate will prevent accidental disengagement of the hooks. The rods 7 are covered with rubber or otherwise treated to resemble the legs of the frog, and at the forward end of the body portion there is a snood 11. It will thus be seen that when a fish takes the bait its jaws will engage the rearward end portions of the rods 7 and will move these rods toward each other, which will permit the hooks 10 to fall apart, when the rods will be moved into their normal positions and the hooks 8 will be forced into the jaws of the fish.

In Fig. 4 there is shown a modification in which the rods 7 are formed of a single piece of metal bowed at its center, this central portion being secured in the recess 6. In Fig. 3 the rods 7 are formed in a similar manner and at their point of union have a rod 12 connected therewith, which carries the snood and which has a spinner 13 revolubly mounted thereon. Bucktail hairs, feathers, &c., are secured to the rod 12 and extend rearwardly to form a fly in the usual manner.

What is claimed is—

1. A device of the class described comprising spaced members having outwardly-directed hooks at one end, said members lying normally with their hooked ends in spaced relation and being arranged for movement of these ends toward each other, hooks pivoted to the inner faces of the members and being adapted for mutual engagement of their bills to hold the members with their hooked ends movable toward each other, said second-named hooks being arranged for disengagement from each other to permit of movement of the members into their normal positions when said members are moved toward each other.

2. In a device of the class described the combination with a portion having the shape of the body of a living object, of spaced legs connected with the body and extending outwardly therefrom, said legs having their outer ends turned away from each other in the form of feet and being sharpened at their extremities and lying normally with their outer end portions in spaced relation and means for holding the legs with their outer portions moved toward each other, said means being arranged for movement into inoperative position when said legs are moved farther toward each other.

3. A device of the class described comprising spaced members having outwardly-directed hooks at one end, said members lying normally with the hooked ends in spaced relation and being arranged for movement of these ends toward each other, hooks pivoted to the inner faces of the members with their bills turned at right angles to each other, said hooks being adapted for engagement with each other to hold the members with their hooked ends moved toward each other, said second-named hooks being adapted for disengagement from each other to permit of movement of the members into their normal positions when said members are farther moved toward each other.

In testimony whereof I affix my signature in presence of two witnesses.

EDWARD L. LULL.

Witnesses:
JAY F. LYON,
LOVINIA R. BARNES.